US012050510B2

(12) United States Patent
Angelo et al.

(10) Patent No.: US 12,050,510 B2
(45) Date of Patent: Jul. 30, 2024

(54) LIFECYCLE HARDWARE, FIRMWARE, AND SOFTWARE TRACKING USING BLOCKCHAIN

(71) Applicant: MICRO FOCUS LLC, Santa Clara, CA (US)

(72) Inventors: Michael F. Angelo, Houston, TX (US); Douglas Max Grover, Provo, UT (US)

(73) Assignee: Micro Focus LLC, Santa Clara, CA (US)

( * ) Notice: Subject to any disclaimer, the term of this patent is extended or adjusted under 35 U.S.C. 154(b) by 238 days.

(21) Appl. No.: 17/484,909

(22) Filed: Sep. 24, 2021

(65) Prior Publication Data

US 2023/0099700 A1    Mar. 30, 2023

(51) Int. Cl.
G06F 11/07    (2006.01)
G06F 9/455    (2018.01)
G06N 20/00    (2019.01)

(52) U.S. Cl.
CPC ........ G06F 11/079 (2013.01); G06F 9/45558 (2013.01); G06N 20/00 (2019.01); *G06F 2009/45591* (2013.01); *G06F 2009/45595* (2013.01)

(58) Field of Classification Search
CPC ......... G06F 11/079; G06F 2009/45595; G06F 2009/45591; G06F 9/45558; G06N 20/00
See application file for complete search history.

(56) References Cited

U.S. PATENT DOCUMENTS

| | | | |
|---|---|---|---|
| 6,360,255 B1 * | 3/2002 | McCormack | H04L 41/082 370/254 |
| 10,572,688 B2 | 2/2020 | Asati | |
| 2019/0044703 A1 * | 2/2019 | Smith | G06F 21/6254 |
| 2019/0065733 A1 | 2/2019 | Forehand | |
| 2019/0188114 A1 * | 6/2019 | Hopper | G06F 11/3414 |
| 2019/0199518 A1 * | 6/2019 | Rady | H04L 9/3226 |
| 2019/0213281 A1 * | 7/2019 | Anders | G06F 16/9535 |
| 2019/0236605 A1 * | 8/2019 | McHale | G06Q 20/407 |
| 2019/0340269 A1 | 11/2019 | Biernat et al. | |
| 2020/0099513 A1 | 3/2020 | Angelo et al. | |
| 2020/0242249 A1 | 7/2020 | Kumar et al. | |

(Continued)

OTHER PUBLICATIONS

U.S. Appl. No. 17/324,872, filed May 19, 2021, Michael F. Angelo.

(Continued)

*Primary Examiner* — Jigar P Patel
(74) *Attorney, Agent, or Firm* — Sheridan Ross P.C.

(57) ABSTRACT

A plurality of events associated with a communication device are received. The plurality of events relate to a plurality of changes of hardware, firmware, and/or software in the communication device. The plurality of events are stored as a plurality of blocks in a blockchain. One or more anomalies associated with the plurality of changes of the hardware, the firmware, and/or the software are identified. In response to identifying the one or more anomalies associated with the plurality of changes of the hardware, the firmware, and/or the software in the communication device, a software image of the communication device is received and added to the blockchain. A second embodiment discloses using this process for a hypervisor using virtual machines or containers.

20 Claims, 9 Drawing Sheets

(56) References Cited

U.S. PATENT DOCUMENTS

2020/0401678 A1    12/2020  Salomon
2021/0279358 A1*    9/2021  Teel .................... G06F 16/2255
2022/0311806 A1*    9/2022  Ibrahimkutty ........ H04L 63/205

OTHER PUBLICATIONS

Refai et al; Blockchain for Secure IoT Firmware Updates; https://yoojeenwoo.github.io/EE209AS; 2021;10 pages.
Wikipedia; Trusted Platform Module; https://en.wikipedia.org/wiki/Trusted_Platform_Module; Sep. 2021; 23 pages.
Yohan, et al; Blockchain-based Firmware Update Framework for Internet-of-Things Environment; Int'l Conf. Information and Knowledge Engineering; 2018; 5 pages.

* cited by examiner

LIFECYCLE HARDWARE, FIRMWARE, AND SOFTWARE TRACKING USING BLOCKCHAIN

FIELD

The disclosure relates generally to blockchain and particularly to tracking changes to hardware, firmware, and software using a blockchain.

BACKGROUND

When hardware/firmware/software in a device is changed, at times, problems occur where the changes cause the device to not work properly. Since the changes to the device are not consistently tracked, it is sometimes difficult to truly know the cause of a failure. In addition, when malware is installed on a device, it is sometimes difficult to identify the location of the malware and when the malware was introduced to the device.

SUMMARY

These and other needs are addressed by the various embodiments and configurations of the present disclosure. A plurality of events associated with a communication device are received. The plurality of events relate to a plurality of changes of hardware, firmware, and/or software in the communication device. The plurality of events are stored as a plurality of blocks in a blockchain. One or more anomalies associated with the plurality of changes of the hardware, the firmware, and/or the software are identified. In response to identifying the one or more anomalies associated with the plurality of changes of the hardware, the firmware, and/or the software in the communication device, a software image of the communication device is received and added to the blockchain.

In a second embodiment, a hypervisor event associated with a communication device is received. The hypervisor event relates to a first change of software and/or firmware of a hypervisor on the communication device. Information about the first hypervisor event is stored in a first block in a blockchain. A first virtual event associated with the communication device is identified. The first virtual event relates to a first change of software in a first virtual machine on the first communication device or a first change of software in first container on the first communication device. The first virtual event is stored in a second block in the blockchain.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extrallonce field, which is stored as the left most leaf node in the merkle tree. The counter parameter is often small at 32-bits so each time it wraps the extrallonce field must be incremented (or otherwise changed) to avoid repeating work. When validating or verifying a block, the hashcash algorithm repeatedly hashes the block header while incrementing the counter & extrallonce fields. Incrementing the extrallonce field entails recomputing the merkle tree, as the transaction or other information is the left most leaf node. The body of the block contains the transactions or other information. These are hashed only indirectly through the Merkle root.

As described herein and in the claims, a change of hardware, firmware and/or software may include adding hardware/firmware/software, removing hardware/firmware/software, upgrading hardware/firmware/software, patching hardware/firmware/software, and/or the like (excluding configuration information). In another embodiment change in hardware/firmware/software may also include changing configuration information that is related to the hardware/firmware/software. For example, a change of software may include updating a license file for a software application.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
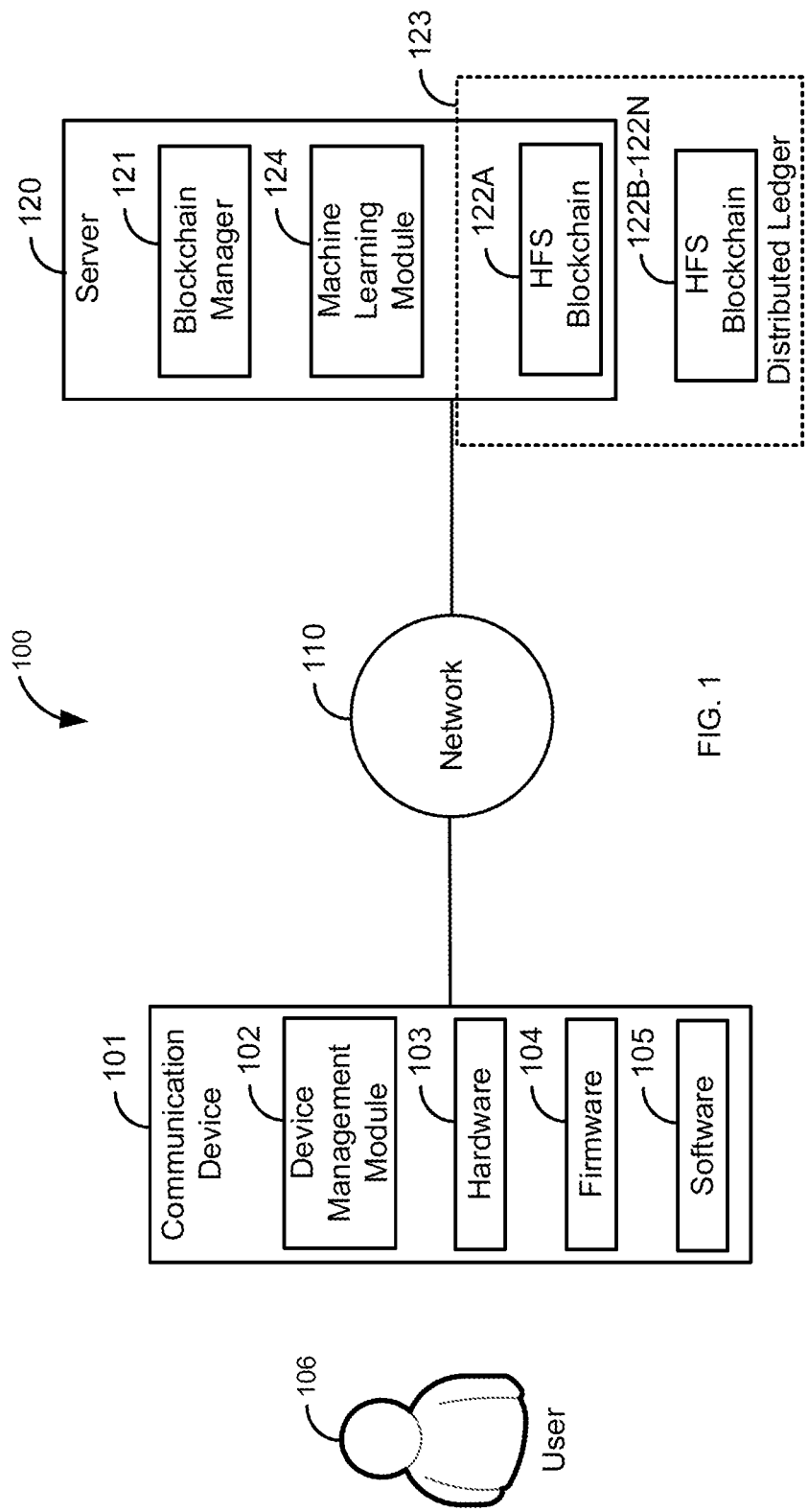
FIG. 1 is a block diagram of a first illustrative system for life cycle tracking of hardware, software, and firmware in a communication device.

FIG. 1 is a block diagram of a first illustrative system 100 for life cycle tracking of hardware 103, firmware 104, and software 105 in a communication device 101. The first illustrative system 100 comprises the communication device 101, a network 110, and a server 120. In addition, a user 106 is also shown for convenience.

The communication device 101 can be or may include any device that can communicate on the network 110, such as a Personal Computer (PC), a telephone, a video system, a cellular telephone, a Personal Digital Assistant (PDA), a tablet device, a notebook device, a smartphone, a server, a router, a gateway, a proxy server, a firewall, a web server, an embedded device, a security system, an Internet-of-Things (IoT) device, and/or the like. Although not shown, there may be multiple communication devices 101 connected to the network 110. The communication device 101 further comprises a device management module 102, hardware 103, firmware 104, and software 105.

The device management module 102 can be any firmware 104/software 105 coupled with hardware 103 that can track changes to hardware 103, firmware 104, and/or software 105. The device management module 102 works in conjunction with the blockchain manager 121 to track any changes to the hardware 103, firmware 104, and/or software 105. In one embodiment, the device management module 102, the hardware 103, the firmware 104, and/or the software 105 may all reside in the same device (e.g., on the server 120).

The device management module 102 may comprise a trusted platform module. In this embodiment, the device management module 102 can manage where the communication device cannot communicate with the server 120. For example, the network 110 is down. In this case, the device management module 102 keeps a local copy of the HFS blockchain 122 along with any changes (e.g., new blocks). For example, if the user 106 adds a software application 105 while the communication device 101 is not connected to the network 110, the device management module 102 can send the update for the software application 105 when the communication device 101 connects to the server 120.

The hardware 103 can be or may include any hardware 103 in the communication device 101, such as, a microprocessor (including a multi-core microprocessor), a memory, a hard disk, a video card, a display, a mouse, a keyboard, a thumb drive, a CD player, a device attached to a USB port, a network interface card, a SIM card, a docking station, a microphone, a headset, a speaker, a touch screen, and/or the like.

The firmware 104 can be or may include any type of firmware 104, such as, boot firmware, installation firmware, device drivers, a hypervisor, and/or the like.

The software 105 can be or may include any type of software, such as, an application, a computer program, a device driver, an operating system, a hypervisor, a virtual machine image, a container image, a word processing program, a web server, a security application, a networking application, an authentication application, a printing application, a scanning application, a graphical editor, and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any hardware 103 coupled with software 105 that can manage a hardware, firmware, and software (HFS) blockchain 122, such as a security server, a firewall, a database server, a distributed computing service, a cloud service, and/or the like. The server 120 further comprises a blockchain manager 121, and a HFS blockchain 122A and a machine learning module 124.

The blockchain manager 122 can be any software 105 that can manage the HFS blockchain 122. The blockchain manager 121 works in conjunction with the device management module 102 to determines any changes to the hardware 103, firmware 104, and/or software 105 in the communication device 101. The blockchain manager 124 may work with nodes in the distributed ledger 123 for adding new blocks to the HFS blockchains 122A-122N.

The HFS blockchain 122A is a blockchain that tracks the changes and/or anomalies to the hardware 103, the firmware 104, and the software 105 on the communication device 101. In FIG. 1, the HFS blockchain 122A is part of the distributed ledger 123. However, the HFS blockchain 122A may not be part of the distributed ledger.

The distributed ledger 123 comprises HFS blockchains 122A-122N where N is an integer of two or more. The distributed ledger 123 is used to replicate multiple copies of the same HFS blockchain 122 across multiple nodes (typically communication devices 101/servers 120) in a distributed network. The distributed ledger 123 provides high immutability of the data stored in the HFS blockchain 122.

The machine learning module 124 can be or may include any software 105 that uses a machine learning process. The machine learning process may use various types of machine learning, such as, supervised machine learning, semi-supervised machine learning, unsupervised machine learning, reinforcement learning, multi-task learning, active learning, online learning, transfer learning, ensemble learning, clustering algorithms, and/or the like.

Although FIG. 1 shows a communication device 101. The processes described herein may work on a stand-alone device.

Figure 2:
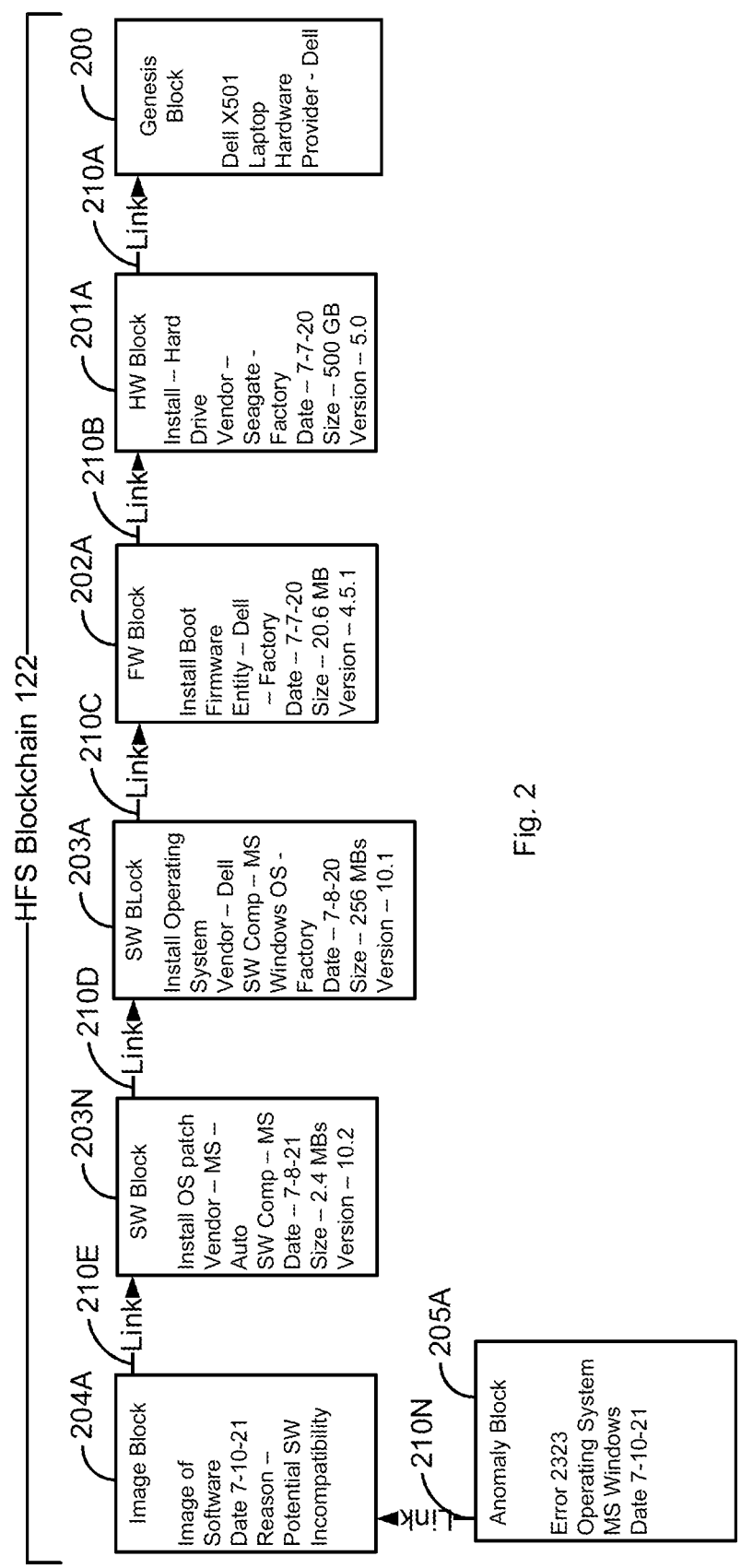
FIG. 2 is a block diagram of a hardware, firmware, and software (HFS) blockchain.

FIG. 2 is a block diagram of a hardware, firmware, and software (HFS) blockchain 122. The HFS blockchain 122 comprises a genesis block 200, a hardware block 201A, a firmware block 202A, software blocks 203A-203N, an image block 204A, and an anomaly block 205A. Although there are only a single hardware block 201A, firmware block 202A, image block 204A, and anomaly block 205A, any number of these blocks 201, 202, 204, and 205 may be in the HFS blockchain 122.

The blocks 201A, 202A, 203A-203N, 204A, and 205A are linked together via links 210A-210N. The links 210A-210N are used to create a forward hash of the HFS blockchain 122. The forward hash is used to identify if any of the information in the blocks 201A, 202A, 203A-203N, 204A, and 205A have been changed.

The HFS blockchain 122 tracks all the hardware 103/firmware 104/software 105 that is added, loaded, modified, and/or removed on the communication device 101. For example, when the boot firmware/operating system/applications are loaded at the factory, each component is stored in the HFS blockchain 122. When a new software 105 application is installed, the new software 105 application is tracked in the HFS blockchain 122. If the software application 105 is patched, the patch is tracked in the HFS blockchain 122. Who/what made the changes can also be tracked in the HFS blockchain 122. If the software 105 is removed from the communication device 101, this information is stored in the HFS blockchain 122 along with who/what removed the software 105. If the communication device 101 is moved to a different entity (e.g., to a different company and/or user 106), updates can be tracked that are made by the new entity. The entity change will be reflected in the HFS blockchain 122 when modifications are made. Likewise, hardware changes can be tracked, such as a memory upgrade, attaching a flash drive, adding a network card, changing a hard disk, etc.

FIG. 2 is an example of a HFS blockchain 122 for a specific communication device 101. The genesis block 200 is the initial block that gets created in the HFS blockchain 122. The genesis block 200 comprises information about the communication device 101. In FIG. 2, the genesis block 200 indicates that the communication device 101 is a Dell® X501 laptop. The genesis block 200 may comprise any information about the communication device 101, such as, a device type (e.g., a laptop, a personal computer, an embedded device, a smartphone), a memory size, a memory type, a memory manufacturer, a microprocessor type, a microprocessor manufacturer, a coprocessor type, a manufacture date, a mother board identifier, a video processor manufacturer, and/or the like.

The hardware block 201 is used for tracking changes to hardware 103 that can be added, removed, and/or modified in the communication device 101, such as, a disk drive, a thumb drive, a CD player, a network card (e.g., a WiFi card), a memory card, and/or the like. The hardware block 201A indicates that the a 500 gigabyte Seagate® drive, version 5.0 was installed on Jul. 7, 2020 in the factory.

The firmware block 202 is used to for tracking changes to firmware 104 that can be added, removed and/or modified in the communication device 101, such as boot up firmware, installation firmware, security fixes, updates, a firmware hypervisor, and/or the like. The firmware block 202A indicates that the boot firmware was installed by Dell at the factory on Jul. 7, 2020.

The software block 203A is created when the operating system is installed on the communication device 101. The software block 203A indicates that the operating system (MS Windows®) was installed at the factory by Dell on Jul. 8, 2020 and has a size of 256 megabytes. The operating system is version 10.1. The software block 203N is where a patch to MS Windows® was automatically updated on Jul. 8, 2021. The patch was 2.4 megabytes and is version 10.2.

In one embodiment, the software block 203A may be based on what is initially installed (e.g., when a disk drive is installed in the factory). At the factory, a hard disk is typically pre-imaged. In this case, the process scans what is on the hard disk and creates an inventory of operating system(s), application(s), etc. that are pre-installed on the hard disk. Based on the inventory, the necessary software blocks 203 are added to the HFS blockchain 122.

The image block 204 is an image of the software 105 (and potentially firmware 104) that are stored on the communication device 101 at a point in time. The image block 204 may actually comprise the software image or the image block 204 may have a link to the image (that is part of the forward hash). The image may be compressed using known compression techniques. In essence, the image block 204 is backup of the software 105 (and potentially firmware 104) on the communication device 101 at a point in time. In FIG. 2, the image block 204A was created on Jul. 10, 2021 based on a potential software incompatibility (e.g., as described below).

The anomaly block 205 is used to store information about an anomaly that is associated with a hardware 103, firmware 104, and/or software 105. The anomaly may be an error, a periodic error, a system crash, a blue screen, a thrown exception, a page fault, a boot failure, a power failure, unusual port activity, unusual authentications, potential malware activity, and/or the like. The device management module 102 tracks the anomalies. This information is then sent to the blockchain manager 121 for storage in the HFS blockchain 122.

The image block 204 may be created based on rules, such as being created periodically, based on an amount of changes, a type of change, change to a specific version of hardware 103, firmware 104, and/or software 105, a number of anomalies, a type of anomaly, and/or the like.

In one embodiment, the image block 204 may be added to the HFS blockchain 122 based on machine learning. The machine learning module 124 may use supervised machine learning that uses training data where conflicts/anomalies/data loss occur between different types of hardware 103, firmware 104, and/or software 105. The training data may be provided as part of a cloud service. For example, based on learning from other communication devices 101, the machine learning module 124 can identify updates/changes that are more likely to cause failures that would warrant the creation of the image block 204. Another example would be where there were a lot operating system failures with a specific operating system patch, the machine learning module 124 could add an image block 204 to the HFS blockchain 122 before allowing the operating system patch to be installed and/or warn the user 106 about the potential problem. The image block 204 may be created based on hardware 103/software 105 incompatibilities, such as, changing hardware 103 and using an existing or new device driver. For example, if a large number of anomaly blocks 205 are added to the HFS blockchain 122 after a new device driver is installed, this may indicate a potential incompatibility. The process could use thresholds/amount of changes, etc. to determine when to add a new image block 204 to the HFS blockchain 122. Other factors/information may be stored in the HFS blockchain 122 for accessing risk, such as, who/when/what/an amount of change, etc. The image blocks 204 may point to lower cost storage versus other blocks in the HFS blockchain 122.

The machine learning module 124 may use unsupervised machine learning based on feedback from the device management module 102 where problems/anomalies occur between different versions of hardware 103, firmware 104, and/or software 105. For example, if multiple page faults occur when an application is installed with a specific version of an operating system, this information can be sent into the machine learning module 124 to identify this anomaly and use the information to identify the same problem in other communication devices 101. The machine learning may identify potential anomalies/failures based on past combinations.

Because the blocks 200-205 identify the specific type of block (e.g., hardware, firmware, software, image, anomaly), this allows for more efficient searching of the HFS blockchain 122. For example, the machine learning module 124 can efficiently search for a specific type of software 105 by only looking at software blocks 203.

Figure 3:
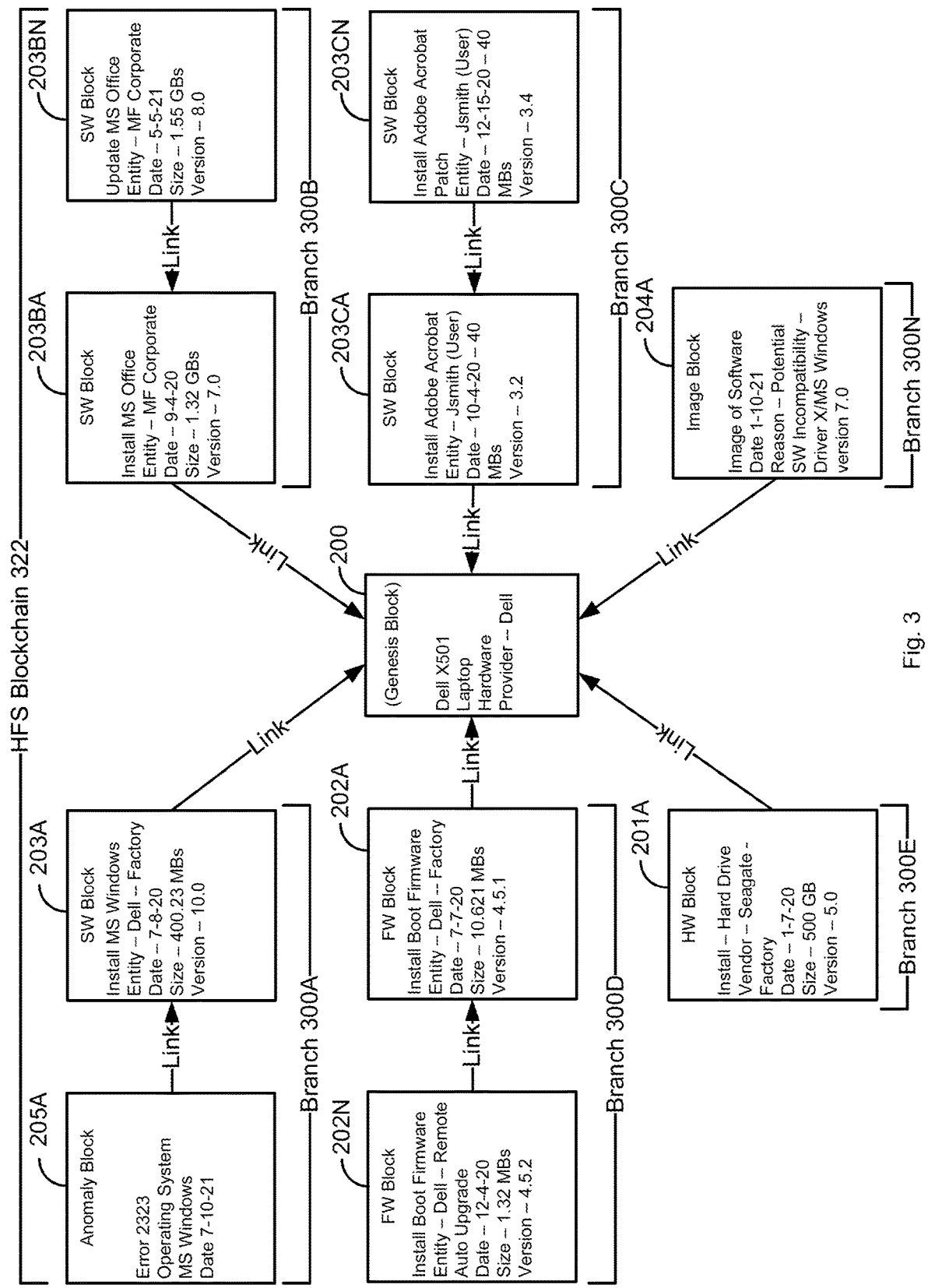
FIG. 3 is a block diagram of a star HFS blockchain that is used for tracking hardware, firmware, and software in a communication device.

FIG. 3 is a block diagram of a star HFS blockchain 322 that is used for tracking hardware 103, firmware 104, software 105, images, and/or anomalies in/of a communication device 101. The star HFS blockchain 322 comprises the genesis block 200 and branches 300A-300N. Each of the branches 300A-300N link back to the genesis block 200. Each of the branches 300A-300N are created based not only on a type (e.g., hardware, firmware, software, image, anomaly, etc.), but also on specific types of hardware 103 (a hard drive), firmware 104 (e.g., boot firmware), software (e.g., MS Windows®), images (a communication device 101 image or a virtual machine image as described below), etc.

The branch 300A is a branch for a specific software application (MS Windows®). The branch 300A comprises software block 203A and anomaly block 205A. The software block 203A is where MS Windows® was installed in the factory on the communication device 101 on Jul. 8, 2020. The anomaly block 205A is where MS Windows® had error 2323 on Jul. 10, 2021.

The branch 300B is a branch for a specific software component (MS Office®). The branch 300B comprises software blocks 203BA-203BN. The software block 203BA is where MS Office® version 7.0 was installed on the communication device 101 on Sep. 4, 2020 by Micro Focus® corporate. The block 203BN is where MS Office® was updated on May 5, 2021 to version 8.0 by Micro Focus® corporate.

The branch 300C is a branch for a specific software component (Adobe Acrobat®). The branch 300B comprises software blocks 203CA-203CN. The software block 203CA shows that Adobe Acrobat® version 3.2 was installed by user 106 John Smith on Oct. 4, 2020. The software block 203CN shows that the user 106 John Smith installed a patch for Adobe Acrobat® on Dec. 15, 2020 that uprated Adobe Acrobat® to version 3.4.

The branch 300D is branch for a specific firmware 104 component (boot firmware). The branch 300D comprise firmware blocks 202A-202N. The firmware block 202A shows that the boot firmware version 4.5.1 was installed at the factory by Dell®. The firmware block 202N shows that the boot firmware was updated by Dell® on Dec. 4, 2020 to version 4.5.2 using an automatic upgrade process.

The branch 300E is for a specific hardware component (a Seagate® hard drive). The branch 300E comprises the hardware block 201A. The hardware block 201A indicates that the 500 gigabyte Seagate hard drive version 5.0 was installed at the factory on Jan. 7, 2020. For hardware 103, there would typically be a single hardware block 201 in the branch 300E. For example, if the Seagate version 5.0 hard drive was replaced, a new branch 300 would be created for the new hard drive. However, if a Seagate hard drive was repaired, a second hardware block 201 may be added to the branch 300E.

The branch 300N is for tracking all the images for the communication device 101A. The branch 300N comprises the image block 204A. While the branch 300N only shows a single image block 204A, as additional image blocks 204 are created, the additional image blocks 204 are added to the end of the branch 300N.

In one embodiment, an image block 204 may be based on a firmware 104/software 105 component/application. For example, there may be one or more image blocks 204 in the branches 300A-300D. In this exemplary embodiment, the branch 300N (that contains the full image) may or may not exist.

As shown in FIG. 3, the anomaly blocks 205 are stored in the branch 300 associated with the hardware 103, firmware 104, and/or software 105. This allows for tracking the anomalies associated with the specific component. In another embodiment, all the anomaly blocks 205 may be stored in their own branch 300. In another embodiment, the anomaly blocks 205 may be stored in the branch 310 for the specific hardware 103, firmware 104, and/or software 105 as shown in FIG. 3 along with the anomalies being stored in separate branch 300.

By storing the anomalies within the HFS blockchain 322 an overlay of branches 300 can be used to compare the braches 300A-300N of the same types/components (between communication devices 101) of hardware 103, firmware 104, and/or software 105 with anomaly blocks 205 to identify anomalies/problems. Using the anomaly blocks 205/other blocks 201-204 can be used by the machine learning module 124 to identify patterns (e.g., using a clustering algorithm).

Figure 4:
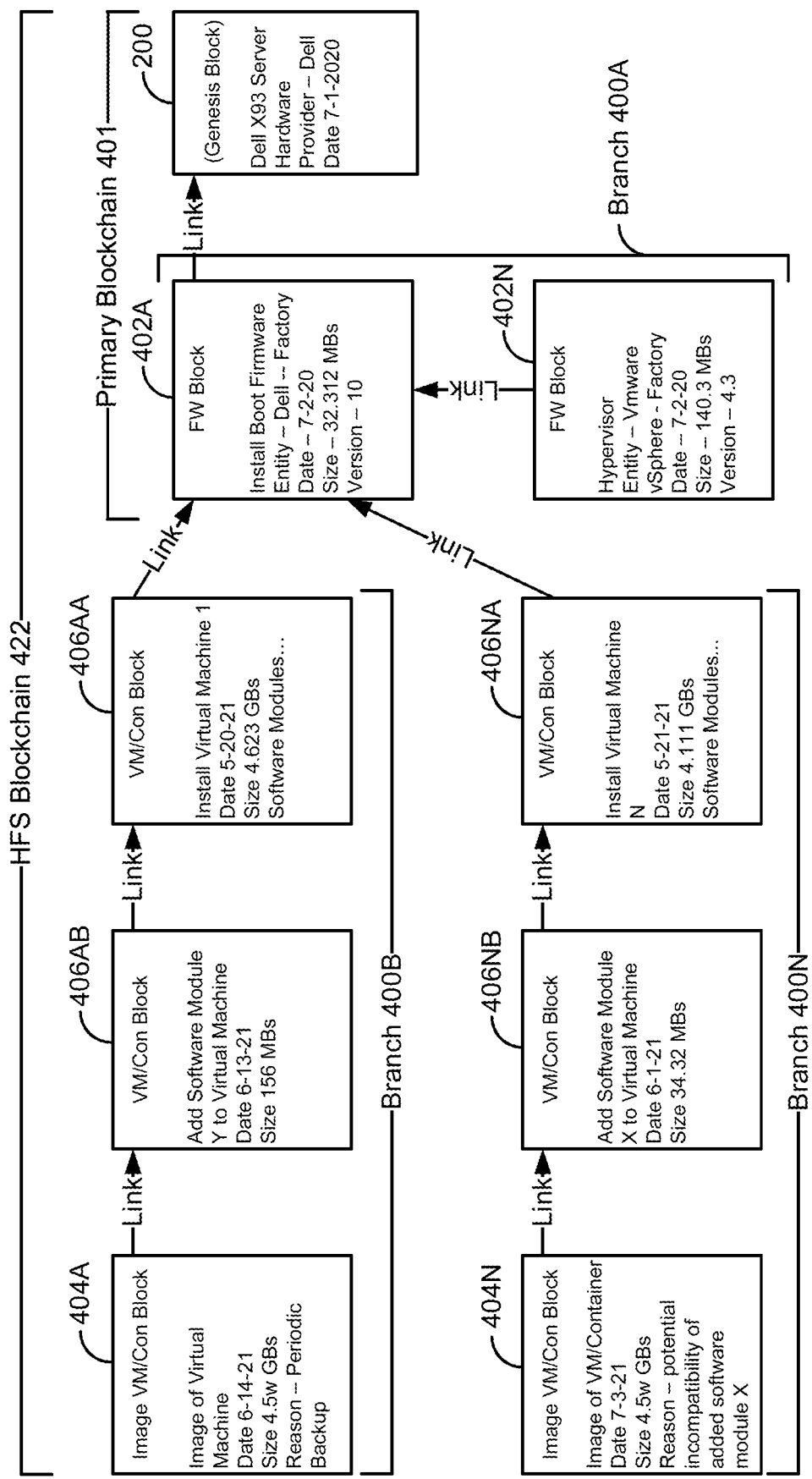
FIG. 4 is a block diagram of a HFS blockchain for tracking firmware/software for a virtual machine/container.

FIG. 4 is a block diagram of a HFS blockchain 422 for tracking firmware 104/software 105 for a virtual machine/container. Virtual machines and containers (e.g., a Kubernetes container) are a type of software 105. The virtual machines/containers use a hypervisor that loads and runs the individual virtual machines/containers. There are two types of hypervisors: 1) a type 1 hypervisor that runs directly on the communication device's 101 hardware 103 (e.g., it may be firmware 104), and 2) a type 2 hypervisor that runs as software 105 like an operating system. FIG. 4 is for the hypervisor that is running directly on the communication device's hardware 103 as firmware 104. However, the structure of FIG. 4 may also work for a software hypervisor where the block 402N is a software block 203.

The HFS blockchain 422 comprises the genesis block 200, firmware blocks 402A-402N in the branch 400A, virtual machine/container (VM/Con) blocks 406AA-406AB and image VM/Con block 404A in the branch 400B, and VM/Con blocks 406NA-406NB/and image VM/Con block 404N in the branch 400N. The genesis block 200 and the firmware block 402A comprise the primary blockchain 401. The primary blockchain 401 is three branches 400A-400N off the firmware block 402A. Although the HFS blockchain 422 does not show any hardware blocks 201, the HFS blockchain 422 may also comprise one or more hardware blocks 201. Likewise, although the HFS blockchain 422 does not show any anomaly blocks 205, the HFS blockchain 422 may comprise one or more anomaly blocks 205 in the branches 400A-400N.

The branch 400A comprises firmware blocks 402A and 402N. The firmware block 402A is for the boot firmware version 10 that was installed in the Factory by Dell® on Jul. 2, 2020. The firmware block 402N is for the VMware® hypervisor vShere version 4.3 that was installed in the factory on Jul. 2, 2020. In this embodiment, the firmware 104 is tracked in the branch 400A. However, in another embodiment, the each firmware 104 component (e.g., boot firmware/hypervisor) may be tracked in a separate branch 400.

Each of the branches 400B-400N are for individual virtual machines/containers. Depending upon implementation, the communication device 101 may use virtual machines or containers. The structure of FIG. 4 will work for either virtual machines or containers. Although only two branches 400B-400N are shown for convenience, there may be any number of virtual machine/container branches 400B-400N.

The branch 400B comprises virtual machine/container (VM/Con) blocks 406AA-406AB and image VM/Con block 404A. The VM/Con block 406AA is for when the virtual machine one was installed on May 20, 2021. The VM/Con block 406AB is where software module Y was added on Jun. 13, 2021. The image VM/Con block 404A is where an image of the virtual machine/container was created and stored (or pointed to) in the image VM/Con block 404A. The image VM/Con block 404A was crated on Jun. 14, 2021 based on periodic backup rules.

The branch 400N comprises VM/Con blocks 400NA-406NB and the image VM/Con block 404N. The VM/Con block 406NA is for when the virtual machine N was installed on May 21, 2021. The VM/Con block 406NB is where software module X was added on Jun. 1, 2021. The image VM/Con block 404N is where an image of the virtual machine/container was created and stored (or pointed to) in the image VM/Con block 404N. The image VM/Con block 404N was created because there was a potential incompatibility of module X that was learned from other HFS blockchains 422.

The image VM/Con blocks 404A-400N may be created using any of the processes described above for the image blocks 204. In addition, the process may use information specific to virtual machines/containers, such as, virtual machine statistics, container statics, virtual machine/container memory usage, docker logs, misconfiguration of virtual machine/container errors, resource errors (containers running out of resources), slower performance, an unusually number of connections for a virtual machine/container, boot configuration errors, hardware errors, etc. and/or the like as input to the machine learning module 124.

In FIG. 4, each virtual machine/container is tracked in a separate branch of the HFS blockchain 422. Alternatively, each virtual machine/container may have its own HSF blockchain 422. For example, for FIG. 4, there would be three blockchains: 1) that comprise block 200 and blocks 402A-402N, 2) a blockchain for virtual machine one (another genesis block 200 and blocks 406AA-406AB and 404A, and 3) a blockchain for virtual machine N (another genesis block 200 and blocks 406NA-406NB and 404N.

The HFS blockchains 422 for multiple individual communication devices 101 can be scanned to identify anomalies across multiple HFS blockchains 422. For example, if all of a sudden, multiple communication devices 101 in a corporation start having a new application that is being installed remotely to the virtual machines/containers where the application is installed from outside the firewall, from a specific communication device 101 on the network 110, by a specific user 106, and/or in a time period, this may indicate that there is some kind of virus/malware being propagated on the network 110. Because all the installation information is tracked and stored in a global set of HSF blockchains 422 (e.g., in a corporate environment), the system will be able to see anomalous patterns that are occurring on the communication devices 101 in the network 110 in real time; this is something that was not possible in the prior art.

Figure 5:
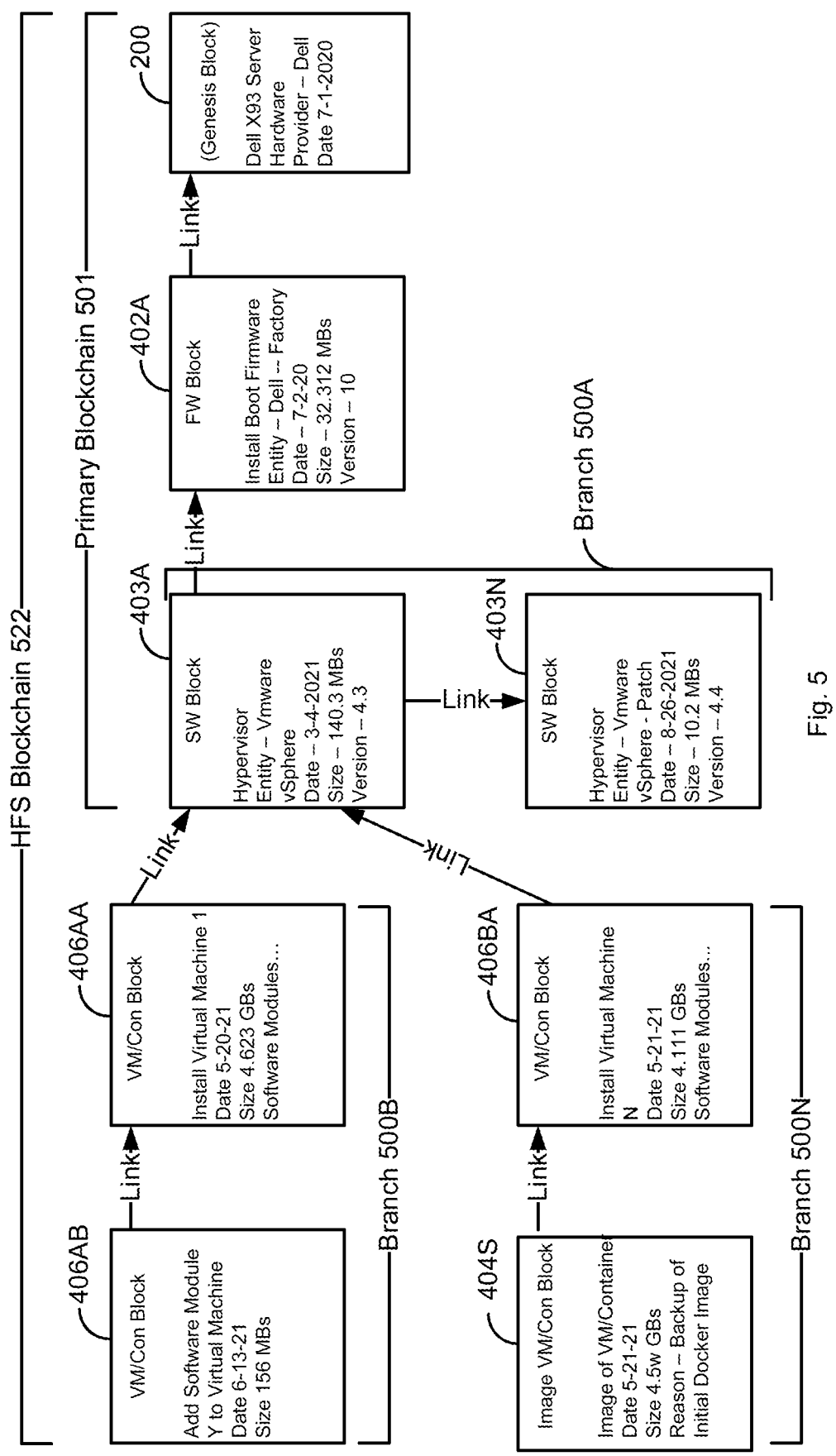
FIG. 5 is a block diagram of a HFS blockchain for tracking firmware/software for a virtual machine/container.

FIG. 5 is a block diagram of a HFS blockchain 522 for tracking firmware 104/software 105 for a virtual machine/container. Although FIG. 5 does not show hardware blocks 201, hardware blocks 201 may be included in the primary blockchain 501. In addition, one or more anomaly blocks 205 may be included in the primary blockchain 501 and in any of the branches 500A-500N. FIG. 5 is for a type 2 hypervisor that runs as software 105 of an operating system.

The HFS blockchain 522 comprises the genesis block 200, firmware block 402A, software blocks 403A-403N, VM/Con blocks 406AA-406AB, 406BA, and 404S. The primary blockchain 501 comprises the genesis block 200, the firmware block 402A, and the software block 403A. The branch 500A comprises the software blocks 403A-403N. The branch 500B comprises the VM/Con blocks 406AA-406AB. The branch 500N comprise the VM/Con block 400BA and the image VM/Con block 404S.

The branch 500A is for tracking of the hypervisor software 105. Software block 403A is for when the hypervisor (VMware wSphere) was installed on Mar. 4, 2021. The software block 403N was created when the hypervisor was patched on Aug. 26, 2021. Although not shown, the branch 500A may comprise one or more anomaly blocks 205. In addition, the branch 500A may comprise one or more image blocks 204. In this example, the image block is an image of the hypervisor.

The branch 500B is similar to the branch 400A. The difference is that the branch 500B links back to the software block 403A instead of the firmware block 402A. The branch 500B contains the VM/Con block 406AA and the VM/Con block 406AB.

The branch 500N is similar to the branch 400N. The difference is that the branch 500N links back to the software block 403A instead of the firmware block 402A. The branch 500N contains the VM/Con block 406BA and the image VM/Con block 404S. The image VM/Con block 404S is crated when the initial docker image is created.

The processes of FIGS. 4-5 may also be used for anomaly detection. For example, the machine learning module 124 may search a first HSF blockchain 422/522 for one or more anomalies. These searches results are compared to additional search results from one or more other HSF blockchains 422/522 to determine if each of the search results are similar. If the search results are similar, access to a resource may be prevented. For example, access to the server 120, a database, and/or the like may be prevented.

Figure 6:
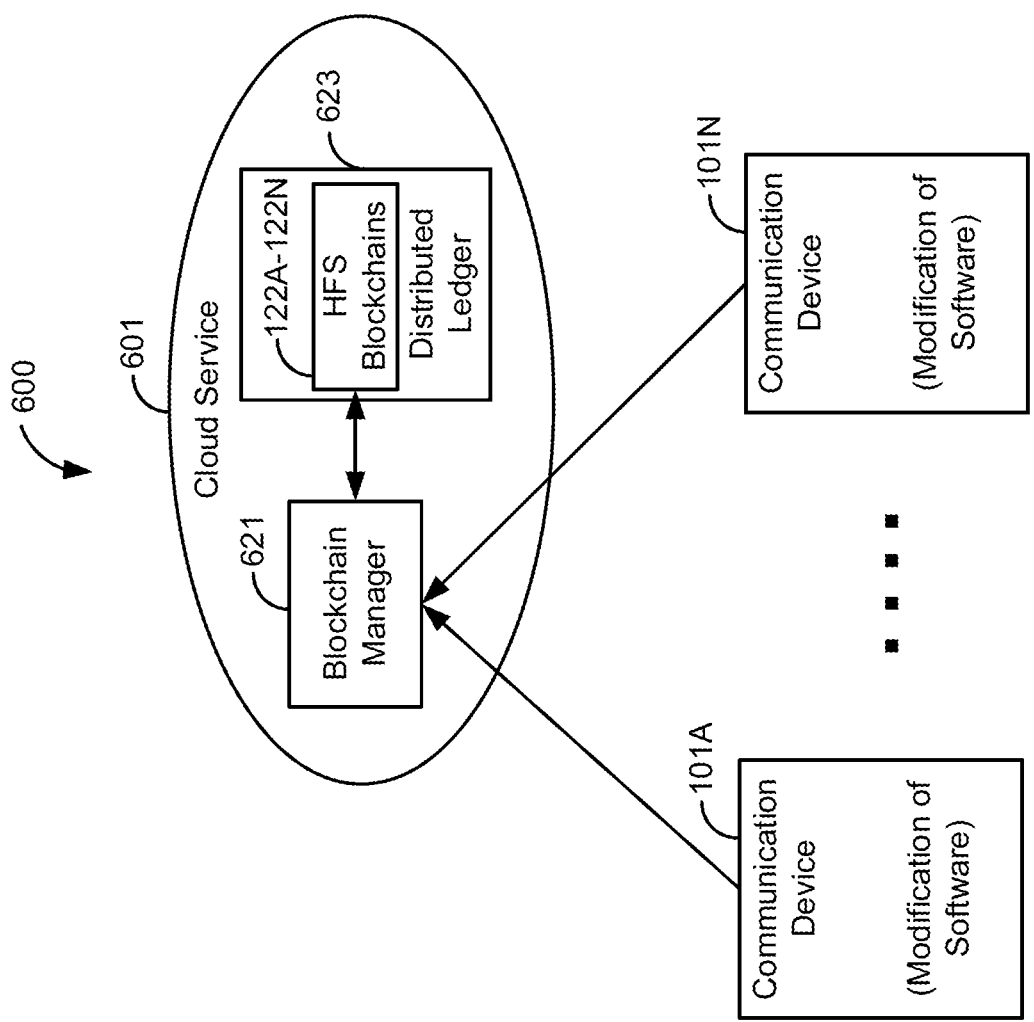
FIG. 6 is a block diagram of a second illustrative system for life cycle tracking of hardware, firmware, and software for a communication device using a cloud service.

FIG. 6 is a block diagram of a second illustrative system 600 for life cycle tracking of hardware 103, firmware 104, and software 105 for communication devices 101A-101N using a cloud service 601. The second illustrative system 600 comprises the cloud service 601 and communication devices 101A-101N.

The cloud service 601 comprises a blockchain manager 621, HFS blockchains 122A-122N, and a distributed ledger 623. The blockchain manager 621 may work similar to the blockchain manager 121. The blockchain manager 621 may work differently from the blockchain manager 121. For example, the blockchain manager 621 may provide a cloud service for multiple tenants. Although not shown, the cloud service 601 may comprise a machine learning module 124.

The distributed ledger 623 may work similar to the distributed ledger 123. The distributed ledger 623 may have more nodes that comprise the HFS blockchains 122A-122N. The communication devices 101A-101N may be any of the communication devices 101 described herein.

The cloud service 601 (e.g., supporting multiple corporations) can be employed to track any hardware 103, firmware 104, and/or software 105 changes on the communication devices 101A-101N. For example, as shown in FIG. 6, the communication devices 101A-101N report to the blockchain manager 621 when updates (e.g., change events) to the HSF blockchain 122A-122N are needed in the distributed ledger 623.

The cloud service 601 may track multiple types of communication devices 101A-101N. For example, the cloud service 601 may track Internet of Things (IoT) devices (e.g., communication devices 101A-101N) and the hardware 103, firmware 104, software 105, anomaly, and/or image changes based on receiving change information from the device management modules 124 on the communication devices 101A-101N.

Figure 7:
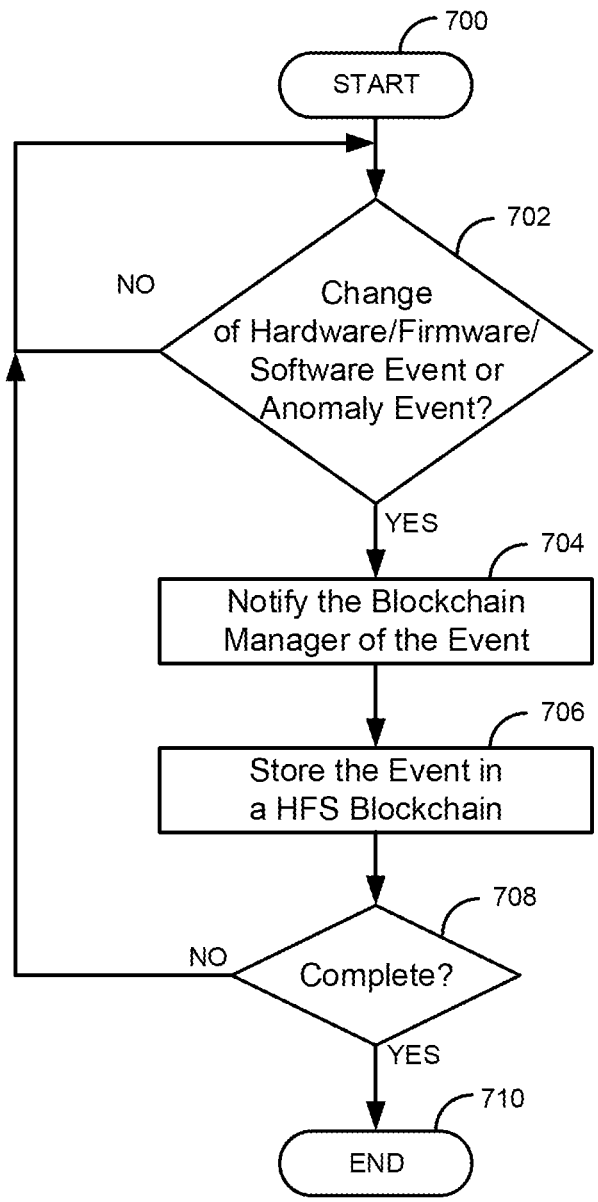
FIG. 7 is a flow diagram of a process for adding hardware, firmware, software and/or anomaly blocks to a HFS blockchain based on anomalies between hardware, firmware, and/or software changes.
Figure 8:
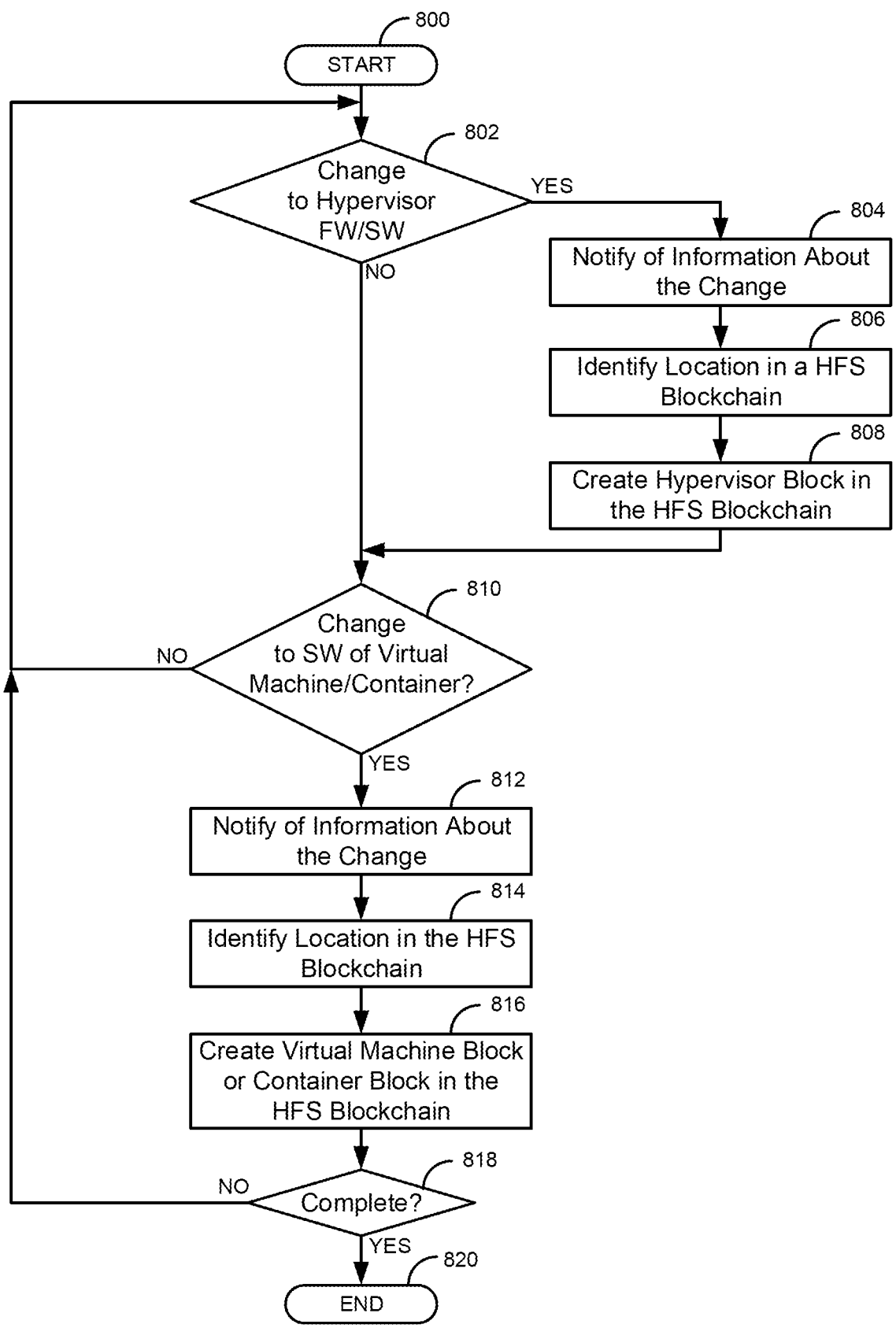
FIG. 8 is a flow diagram of a process for tracking firmware/software for a virtual machine/container.
Figure 9:
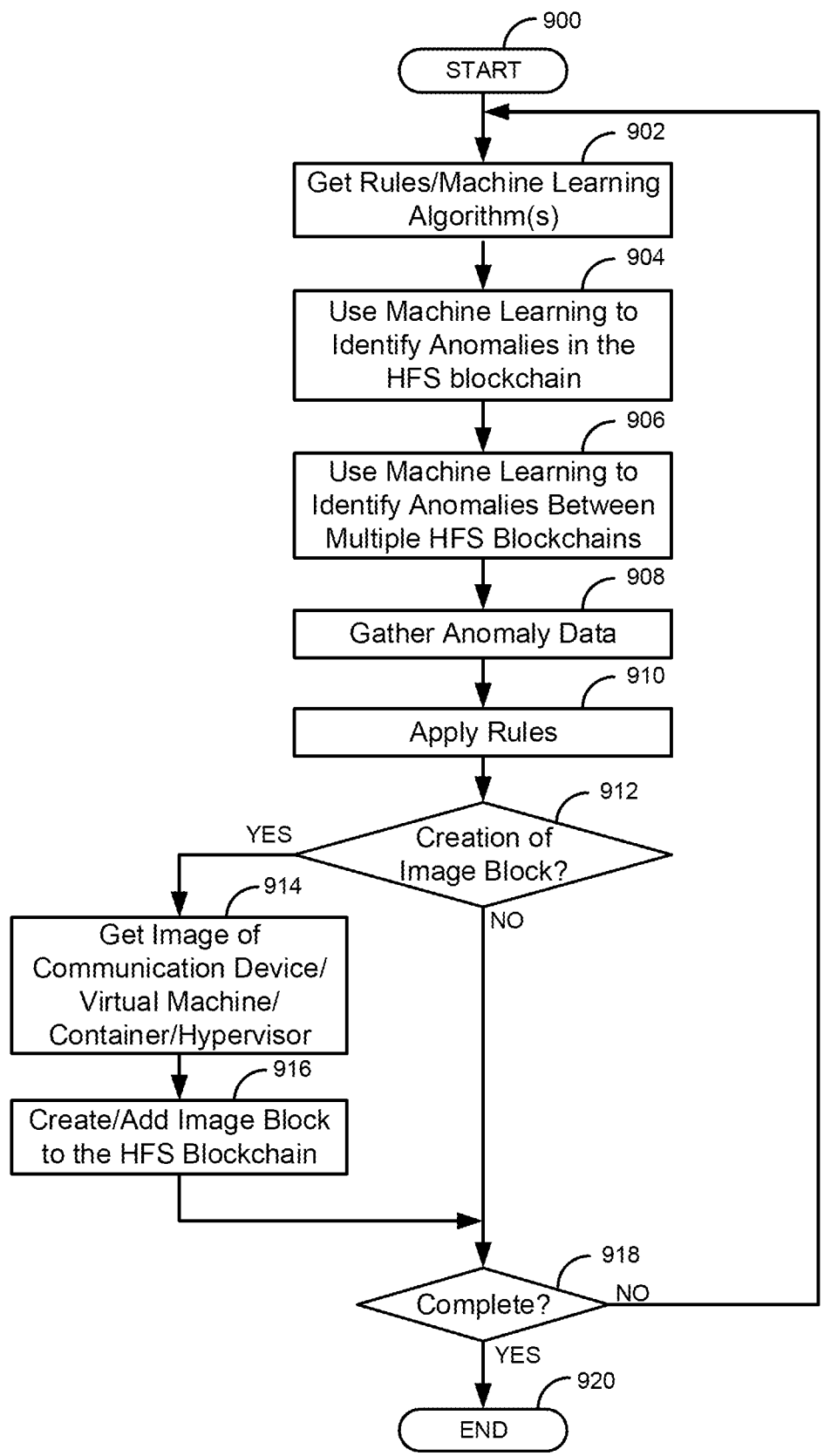
FIG. 9 is a flow diagram of a process for determining when to create an image block in an HFS blockchain.

FIG. 7 is a flow diagram of a process for adding hardware, firmware, software and/or anomaly blocks to a HSF blockchain 122/322/422 based on anomalies between hardware 103, firmware 104, and/or software 105 changes. Illustratively, the communication devices 101A-101N, the device management module 102, the hardware 103, the firmware 104, the software 105, the server 120, the blockchain manager 121, the machine learning module 124, the HSF blockchains 122A-122N/322/422/522, the distributed ledger 123, the cloud service 601, and the distributed ledger 623 stored-program-controlled entities, such as a computer or microprocessor, which performs the method of FIGS. 7-9 and the processes described herein by executing program instructions stored in a computer readable storage medium, such as a memory (i.e., a computer memory, a hard disk, and/or the like). Although the methods described in FIGS. 7-9 are shown in a specific order, one of skill in the art would recognize that the steps in FIGS. 7-9 may be implemented in different orders and/or be implemented in a multi-threaded environment. Moreover, various steps may be omitted or added based on implementation.

The process starts in step 700. The device management module 102, determines if a change hardware 103, firmware 104, software 105 and/or an anomaly event has occurred in step 702. If a change of hardware 103, firmware 104, software 105 and/or anomaly event has not occurred in step 702, the process of step 702 repeats.

If a change of hardware 103, firmware 104, software 105 and/or anomaly event has occurred in step 702, device management module 102 notifies the blockchain manager 121/621 of the event in step 704. The blockchain manger 121/621 stores, in step 706, the event in the HFS blockchain 122/322/422/522 as described above. The process determines, in step 708, if the process is complete. If the process is not complete in step 708, the process goes back to step 702. Otherwise, if the process is complete in step 708, the process ends in step 710.

FIG. 8 is a flow diagram of a process for tracking firmware 104/software 105 for a virtual machine/container. The process starts in step 800. The device management module 102 determines, in step 802, if a change has occurred to the hypervisor (could be a change to either firmware 104 and/or software 105). If a change has occurred in the hypervisor in step 802, the device management module 102 notifies the blockchain manager 121/621, in step 804, about the change (e.g., is it a patch or a new install) to the blockchain manager 121. The blockchain manager 121/621 identifies the location in the HFS blockchain 422/522 in step 806. The blockchain manager 121 then creates, in step 808, the hypervisor block in the HFS blockchain 422/522 (e.g., block 402N as shown in FIG. 4 or blocks 403A-N as shown in FIG. 5). The process then goes to step 810.

If the change to the hypervisor event has not occurred in step 802, the process goes to step 810. In step 810, the device management module 102, determines, in step 810, if a change to the software 105 of a virtual machine/container has occurred. If a change to the software 105 of the virtual machine/container has not occurred in step 810, the process goes back to step 802. Otherwise, if the change to the virtual machine/container has occurred in step 810, the device management module 102 notifies the blockchain manager 121/621 of information about the change in step 812 (e.g., a new software 105 application has been added to the virtual machine). The blockchain manager 121/621 identifies a location in the HFS blockchain 422/522 in step 814. The blockchain manger 121/621 creates a virtual machine block or container block in the HFS blockchain 422/522 in step 816 (e.g., block 406AB as shown in FIG. 4).

The process determines, in step 818, if the process is complete. If the process is not complete in step 818, the process goes back to step 802. Otherwise, if the process is complete in step 818, the process ends in step 820.

FIG. 9 is a flow diagram of a process for determining when to create an image block 204/404 in an HFS blockchain 122/322/422/522. The process starts in step 900. The machine learning module 124 gets rules/machine learning algorithms in step 902. There may be predefined rules and/or administered rules. For example, the rules may be where an administrator indicated that a certain type of anomaly is not an anomalous behavior or when to do a periodic backup using an image block 204/404. The machine learning module 124 may use multiple types of machine learning algorithms based on different types of anomaly detection. The machine learning module 124 may select a specific machine learning algorithm based on the rules.

The machine learning module 124 uses the machine learning to identify anomalies in the HFS blockchain 122/322/422/522 in step 904. The machine learning module 124 uses the machine learning to identify anomalies between multiple HFS blockchains 422/522 in step 906. Identification of anomalies may be based on the hardware blocks 201, firmware blocks 202, software blocks 203, and/or anomaly blocks 205 like described herein. The machine learning module 124 gathers the anomaly data in step 908 and then applies the rules in step 910 to determine if an image block 204/404 needs to be created.

Based on the rules/identified anomalies the machine learning module 124, in step 912, determines if an image block is to be created. If an image block is not to be crated in step 912, the process goes to step 918. Otherwise, if an image block is to be created in step 912, the blockchain manager 121/621 gets an image of the communication device 101, the virtual machine, or the container (based on implementation) in step 914. The blockchain manager 121/621 creates and then adds the image block 204/404 in step 916.

The process determines, in step 918, if the process is complete. If the process is not complete in step 918, the process goes back to step 902. Otherwise, if the process is complete in step 918, the process ends in step 920.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more user's premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system, comprising:
a microprocessor; and
a computer readable medium, coupled with the microprocessor and comprising microprocessor readable and executable instructions that, when executed by the microprocessor, cause the microprocessor to:
receive a first hypervisor event associated with a first communication device,
wherein the first hypervisor event relates to a first change of software and/or firmware of a hypervisor on the first communication device;
store the first hypervisor event in a first block in a first blockchain;
identify a first virtual event associated with the first communication device, wherein the first virtual event relates to a first change of software in a first virtual machine on the first communication device or a first change of software in a first container on the first communication device;
store the first virtual event in a second block in the first blockchain;
search the first blockchain to identify one or more anomalies to generate first search results;
compare the first search results to second search results from a second blockchain for a second communication device; and
determine if the first search results and the second search results are anomalous for both the first communication device and the second communication device.

2. The system of claim 1, wherein the first virtual event relates to the first change of software in the first virtual machine on the first communication device.

3. The system of claim 1, wherein the first virtual event relates to the first change of software in the first container on the first communication device.

4. The system of claim 1, wherein the microprocessor readable and executable instructions further cause the microprocessor to:
in response to determining that the first search results and the second search results are anomalous for both the first communication device and the second communication device, take an action to prevent access to a resource.

5. The system of claim 1, wherein the one or more anomalies are identified based on machine learning and wherein the machine learning is based on one of:
the first blockchain;
the second blockchain of the second communication device;
supervised machine learning;
unsupervised machine learning;
a software incompatibility;
a firmware incompatibility;
a hardware incompatibility;
a hardware/software incompatibly;
a page fault;
a memory usage anomaly;
a thrown exception; and
a system reboot.

6. The system of claim 1, wherein the first blockchain includes a primary blockchain.

7. The system of claim 6, wherein the primary blockchain includes a genesis block.

8. The system, of claim 1, wherein the one or more anomalies include one or more of:
an error;
a system crash;
a page fault;
a power failure;
a boot failure; or
potential malware activity.

9. A system, comprising:
a microprocessor; and
a computer readable medium, coupled with the microprocessor and comprising microprocessor readable and executable instructions that, when executed by the microprocessor, cause the microprocessor to:
receive a first hypervisor event associated with a first communication device,
wherein the first hypervisor event relates to a first change of software and/or firmware of a hypervisor on the first communication device;
store the first hypervisor event in a first block in a first blockchain;
identify a first virtual event associated with the first communication device,
wherein the first virtual event relates to a first change of software in a first virtual machine on the first communication device or a first change of software in a first container on the first communication device;
store the first virtual event in a second block in the first blockchain;
receive a second virtual event associated with the first communication device,
wherein the second virtual event relates to a second change of software in a second virtual machine on the first communication device or a second change of software in a second container on the first communication device; and
store the second virtual event in a third block in the first blockchain,
wherein storing the first virtual event as the second block in the first blockchain comprises creating a first branch in the first blockchain and wherein storing the second virtual event as the third block in the first blockchain comprises creating a second branch in the first blockchain.

10. The system of claim 9, wherein the microprocessor readable and executable instructions further cause the microprocessor to:
identify a second hypervisor event associated with the first communication device; and
store the second hypervisor event in a fourth block in a first blockchain,
wherein the second hypervisor event relates to a second change of software and/or firmware of the hypervisor on the first communication device and
wherein the fourth block is stored in a third branch of the first blockchain.

11. A method, comprising:
receiving, by a microprocessor, first information about a first hypervisor event associated with a first communication device,
wherein the first hypervisor event relates to a first change of software and/or firmware of a hypervisor on the first communication device;
storing, by the microprocessor, the first hypervisor event in a first block in a first blockchain;
identifying, by the microprocessor, a first virtual event associated with the first communication device,
wherein the first virtual event relates to a first change of software in a first virtual machine on the first communication device or a first change of software in a first container on the first communication device;
storing, by the microprocessor, the first virtual event in a second block in the first blockchain;
searching, by the microprocessor, the first blockchain to identify one or more anomalies to generate first search results;
comparing, by the microprocessor, the first search results to second search results from a second blockchain for a second communication device; and
determining, by the microprocessor, if the first search results and the second search results are anomalous for both the first communication device and the second communication device.

12. The method of claim 11, further comprising:
in response to determining that the first search results and the second search results are anomalous for both the first communication device and the second communication device, taking an action, by the microprocessor, to prevent access to a resource.

13. The method of claim 11, wherein the first virtual event relates to the first change of software in the first virtual machine on the first communication device.

14. The method of claim 11, wherein the first virtual event relates to the first change of software in the first container on the first communication device.

15. The method of claim 11, wherein the one or more anomalies are identified based on machine learning and wherein the machine learning is based on one of:
the first blockchain;
the second blockchain of the second communication device;
supervised machine learning;
unsupervised machine learning;
a software incompatibility;
a firmware incompatibility;
a hardware incompatibility;
a hardware/software incompatibly;
a page fault;
a memory usage anomaly;
a thrown exception; and
a system reboot.

16. The method of claim 11, wherein the first blockchain includes a primary blockchain.

17. The method of claim 16, wherein the primary blockchain includes a genesis block.

18. The method of claim 11, wherein the one or more anomalies include one or more of:
an error;
a system crash;
a page fault;
a power failure;
a boot failure; or
potential malware activity.

19. A method, comprising:
receiving, by a microprocessor, first information about a first hypervisor event associated with a first communication device,
wherein the first hypervisor event relates to a first change of software and/or firmware of a hypervisor on the first communication device;
storing, by the microprocessor, the first hypervisor event in a first block in a first blockchain;
identifying, by the microprocessor, a first virtual event associated with the first communication device,
wherein the first virtual event relates to a first change of software in a first virtual machine on the first communication device or a first change of software in a first container on the first communication device;
storing, by the microprocessor, the first virtual event in a second block in the first blockchain
identifying, by the microprocessor a second virtual event associated with the first communication device,
wherein the second virtual event relates to a second change of software in a second virtual machine on the first communication device or a second change of software in a second container on the first communication device; and
storing, by the microprocessor the second virtual event in a third block in the first blockchain,
wherein storing the first virtual event as the second block in the first blockchain comprises creating a first branch in the first blockchain and
wherein storing the second virtual event as the third block in the first blockchain comprises creating a second branch in the first blockchain.

20. The method of claim 19, further comprising:
identifying, by the microprocessor, a second hypervisor event associated with the first communication device; and
storing, by the microprocessor, the second hypervisor event in a fourth block in a first blockchain,
wherein the second hypervisor event relates to a second change of software and/or firmware of the hypervisor on the first communication device and
wherein the fourth block is stored in a third branch of the first blockchain.

* * * * *